H. Burk,
Hand-Washing Machine,

N° 56,523.          Patented July 24, 1866.

Witnesses:          Inventor;

UNITED STATES PATENT OFFICE.

HIRAM BURK, OF MINERAL POINT, OHIO.

IMPROVED CLOTHES-WASHING RUBBER.

Specification forming part of Letters Patent No. 56,523, dated July 24, 1866.

*To all whom it may concern:*

Be it known that I, HIRAM BURK, of Mineral Point, Tuscarawas county, State of Ohio, have invented a new and useful Improvement in Clothes-Washing Rubber; and I do hereby declare that the following is a full, clear, and exact description thereof, which will enable others skilled in the art to make and use the same, reference being had to the accompanying drawings, forming part of this specification, in which—

Figure 1:
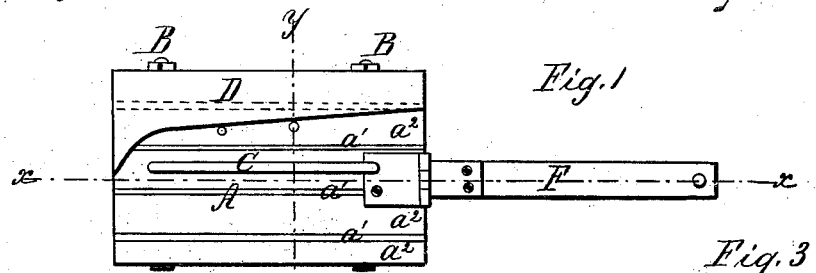
Figure 3:
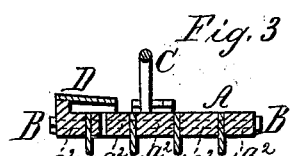
Figure 2:
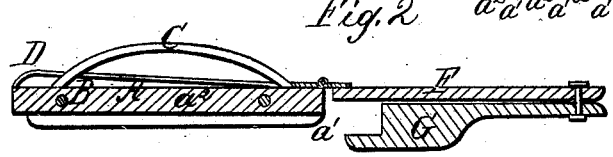
Figure 4:
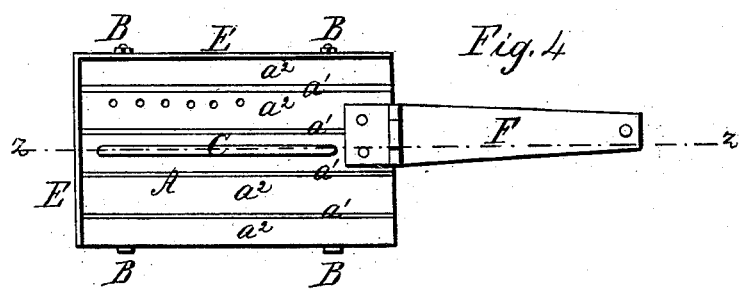
Figure 5:
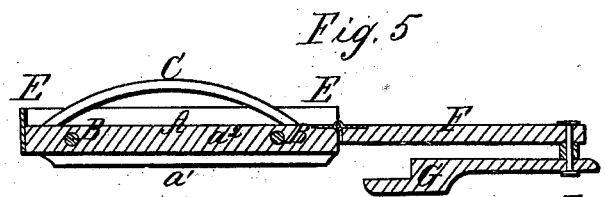

Figure 1 is a top view of my improved clothes-washing rubber. Fig. 2 is a longitudinal section of the same, taken through the line $x\ x$, Fig. 1. Fig. 3 is a cross-section of the same, taken through the line $y\ y$, Fig. 1. Fig. 4 is a top view of a modification of the same. Fig. 5 is a longitudinal section of the same, taken through the line $z\ z$, Fig. 4.

Similar letters of reference indicate like parts.

My invention has for its object to furnish an improved clothes-washing rubber to be attached to a wash or rubbing board to take the place of the hands in washing clothes; and it consists in a rubber formed by combining, with the rubber-board having rubber flanges, a plate, handle, and hinged and pivoted arms, as hereinafter more fully described.

A is the rubber-board, which is formed by clamping rubber strips or flanges $a'$ between strips of wood $a^2$ by means of bolts B passing through the strips of wood and rubber, as shown in the drawings.

The handle C is of such a shape as to be readily grasped in using the rubber, and is attached to the central part of the rubber, as shown in the drawings.

In the rubber shown in Figs. 1, 2, and 3 the lower wooden strip, $a^2$, is made with a projecting flange, as shown in Fig. 3. To the edge of this flange and to the end edge of the rubber is attached a plate, D, forming a sort of cup, which, as the rubber is moved up along the wash-board, brings up with it a quantity of soap-suds, which escape through holes formed in the wooden strips of the rubber upon the clothes that are being washed.

In the modification of the rubber shown in Figs. 4 and 5 the wooden flange and metallic cap are replaced by a plate, E, attached to the lower and end edges of the rubber, which brings up the water, as before described; but I prefer the construction first described.

To the end of the rubber-board A is hinged one end of the arm F, the other end of which is pivoted to another arm, G. This latter is screwed to the under side of the edge of the wash-board by screws passing through a shoulder formed on the end of the arm G, as shown in Figs. 2 and 5.

The rubber-board A, being hinged to the arm F, enables the rubber to be raised for the adjustment of the clothes being washed, and the arm F, being pivoted to the arm G, enables the rubber to be moved up and down along the wash-board in washing the clothes in the same manner as the clothes are rubbed in washing by hand.

I claim as new and desire to secure by Letters Patent—

An improved clothes-washing rubber, formed by combining, with a rubber-board, A, having rubber flanges $a'$, a plate, D, or its equivalent, a handle, C, the hinged and pivoted arms F and G, substantially as described, and for the purpose set forth.

HIRAM BURK.

Witnesses:
JOHN EAKIN,
LUCINDA EAKIN.